(12) United States Patent
Sasaki et al.

(10) Patent No.: US 8,336,486 B2
(45) Date of Patent: Dec. 25, 2012

(54) TAPE CORE WIRE MANUFACTURING APPARATUS, TAPE CORE WIRE WIRING APPARATUS AND WIRING METHOD

(75) Inventors: Kyoichi Sasaki, Shizuoka (JP); Masayoshi Suzuki, Fujieda (JP); Ken Sukegawa, Tokyo (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 220 days.

(21) Appl. No.: 12/757,666

(22) Filed: Apr. 9, 2010

(65) Prior Publication Data
US 2010/0192846 A1    Aug. 5, 2010

Related U.S. Application Data

(62) Division of application No. 11/423,302, filed on Jun. 9, 2006, now Pat. No. 7,810,229.

(30) Foreign Application Priority Data

Jun. 13, 2005   (JP) ................................. 2005-172605
Jun. 13, 2005   (JP) ................................. 2005-172606

(51) Int. Cl.
*B05C 3/12*   (2006.01)
*B05C 5/00*   (2006.01)
*B05C 11/02*  (2006.01)
*B05B 3/00*   (2006.01)

(52) U.S. Cl. ........ 118/413; 118/419; 118/420; 118/411; 118/412; 118/123; 118/304; 118/323; 118/325; 29/748; 29/605; 29/606

(58) Field of Classification Search .............. 118/325, 118/419, 420, 123, 300, 313–316, 410–413, 118/304, 323; 385/114, 128; 65/408; 29/748, 29/605, 606, 754, 791, 854; 336/200, 223, 336/232, 233
See application file for complete search history.

(56) References Cited

U.S. PATENT DOCUMENTS
4,291,732 A    9/1981   Artzer
(Continued)

FOREIGN PATENT DOCUMENTS
JP   59-226304   12/1984
(Continued)

OTHER PUBLICATIONS

Japanese Patent Office, Japanese Office Action in corresponding JP Application No. 2005-172605, issued on Oct. 28, 2008, 5 pages.
(Continued)

*Primary Examiner* — Yewebdar Tadesse
(74) *Attorney, Agent, or Firm* — Wood, Herron & Evans, LLP (57) ABSTRACT

There is provided a tape core wire manufacturing apparatus that makes it possible to manufacture a large variety of tape core wires in small quantities with ease, and in addition, makes it easy to apply a uniform coating over a broad width. In the tape core wire manufacturing apparatus of the present invention, a coating apparatus that applies a coating material to respective optical fiber core wires has a coating head that moves in the longitudinal direction relatively to the respective optical fiber core wires that have been placed in a row on a coating jig. The coating head has a position adjustment surface that is located in the vicinity of a coating member of the coating head and adjusts the positioning in the thickness direction of the respective optical fiber core wires when these are in the form of a tape. This position adjustment surface is pressed against the respective optical fiber core wires. The coating head is also able to be tilted in the longitudinal direction.

7 Claims, 8 Drawing Sheets

U.S. PATENT DOCUMENTS

| | | | |
|---|---|---|---|
| 5,276,759 A * | 1/1994 | Nguyen et al. | 385/114 |
| 6,841,735 B1 * | 1/2005 | Schilson et al. | 174/117 F |
| 2005/0117859 A1 * | 6/2005 | Suzuki et al. | 385/114 |
| 2006/0277752 A1 | 12/2006 | Sasaki | |

FOREIGN PATENT DOCUMENTS

| | | |
|---|---|---|
| JP | S60-72451 | 5/1985 |
| JP | 63-187208 | 8/1988 |
| JP | 05-119243 | 5/1993 |
| JP | 06-123826 | 5/1994 |
| JP | 07-503095 | 3/1995 |
| JP | H08-054522 | 2/1996 |
| JP | 2001160412 A | 6/2001 |
| JP | 2003-241041 | 8/2003 |
| JP | 2004-163634 | 6/2004 |
| JP | 2004-240152 | 8/2004 |
| WO | 93/14505 A1 | 7/1993 |

OTHER PUBLICATIONS

Japanese Patent Office, Japanese Office Action in corresponding JP Application No. 2005-172606, issued on Nov. 18, 2008, 3 pages.
Japanese Patent Office, Japanese Office Action in corresponding JP Application No. 2005-172605, issued on Nov. 24, 2009, 4 pages.
Japanese Patent Office, Japanese Office Action in corresponding JP Application No. 2005-172605, issued Jul. 13, 2010, 3 pages.

* cited by examiner

TAPE CORE WIRE MANUFACTURING APPARATUS, TAPE CORE WIRE WIRING APPARATUS AND WIRING METHOD

CROSS REFERENCE TO RELATED APPLICATIONS

This application is a divisional of U.S. patent application Ser. No. 11/423,302 entitled "TAPE CORE WIRE WIRING APPARATUS", filed Jun. 9, 2006, now U.S. Pat. No. 7,810,229 which claims priority to Japanese Patent Application Nos. 2005-172605 and 2005-172606, both filed on Jun. 13, 2005, the disclosures of which are hereby incorporated by reference herein.

BACKGROUND OF THE INVENTION

1. Field of the Invention

The present invention relates to a manufacturing apparatus for a tape core wire that is made by forming a plurality of single core wires into a tape. The present invention also relates to a tape core wire wiring apparatus and wiring method.

2. Description of the Related Art

Conventionally, a tape core wire is known that is formed by arranging a plurality of single core wires (such as optical fiber core wires or the like) in a row and then coating them to form a single body. In a manufacturing apparatus that manufactures such core wires, firstly, each single core wire is continuously unwound from a drum and transported so as to be arranged in a row with the other wires. In addition, a coating is applied to the entire circumference (i.e., to both surfaces and both sides) thereof. Accordingly, an elongated tape core wire can be manufactured (see, for example, Japanese Patent Application Laid-Open (JP-A) No. H5-119243 and H6-123826).

In contrast, tape core wires have also been created in which the coating is applied to only one surface of the respective single core wires that have been arranged in a row. In contrast to a tape core wire having the above-described two surface coating, a tape formed using this method is excellent in flexibility and tear workability, and is particularly favorable for use in tape core wires that use optical fiber core wires in which the mechanical characteristic requirements in particular are very strict. In an apparatus that manufactures this type of single surface coating tape core wire, the coating is not applied to each single core wire as it is being transported, but instead the respective single core wires are arranged in a row and are temporarily fixed in a coating jig and the coating is then applied by relatively moving a nozzle that applies the coating material to the respective single core wires (see, for example, Japanese Patent Application Laid-Open (JP-A) No. 2004-163634). This method is favorable as it can be used for the manufacturing of short tape core wires and can also be used to easily coat single core wires that extend out from a certain component, and can be used for the manufacturing of small quantities but a large variety of tape core wires.

In the latter apparatus described above, when the nozzle is being moved relatively to the respective single core wires in the coating jig, sometimes mispositioning occurs in the position of the nozzle relative to each of the single core wires. This is caused by shaking of the nozzles and coating jig during this relative movement, or by smoothness imperfections that are caused by bending or the like of the coating jig, and can lead to irregularities in the thickness of the application of the coating material and to defects in the coating of the respective single core wires.

Moreover, in recent years, there have been demands for an even larger number of single core wires to be formed into a tape core wire, however, if there is a corresponding increase in the width of the tape core wire, then in the latter apparatus described above, there needs to be an increase in the size or the like of the nozzles. This makes it difficult for the coating material to be discharged uniformly from the nozzles and, in the same way as is described above, defects in the coating of the respective single core wires may occur.

Therefore, a first object of the present invention is to provide a tape core wire manufacturing apparatus that can be easily used to manufacture a large variety of tape core wires in small quantities, and can also easily provide a uniform coating over a broad width.

Furthermore, in the latter apparatus described above, how to position a wiring apparatus that arranges the respective single core wires in a row relative to a coating apparatus that applies the coating material onto each single core wire is an important problem for the efficient manufacturing of a large variety of tape core wires in small quantities.

Namely, if the wiring apparatus is simply positioned on the upstream side of the coating apparatus, the processing time is different in the coating step and the wiring step. In addition, preparation and adjustments become complex when products that have different specifications are being manufactured. Due to reasons such as these, there are times when it is difficult to efficiently manufacture a large variety of tape core wires in small quantities.

Therefore, a second object of the present invention is to provide a tape core wire wiring apparatus and wiring method that make it possible to efficiently manufacture a large variety of tape core wires in small quantities.

SUMMARY OF THE INVENTION

In order to attain the above described objects, a first aspect of the present invention is a tape core wire manufacturing apparatus that arranges a plurality of single core wires in a row to form a tape shape and that coats these to form a single body, comprising a coating apparatus that applies a coating material to the respective single core wires, wherein the coating apparatus has a coating head that moves in a longitudinal direction relatively to the respective single core wires arranged in a row on a coating jig, and the coating head has a position adjustment surface that adjusts the position in a thickness direction of the respective single core wires of the tape shape in the vicinity of a coating member of the coating head, and the coating head presses the position adjustment surface against the respective single core wires and the coating head is able to be tilted in the longitudinal direction.

According to this structure, by placing the respective single core wires in a row on a coating jig and then applying a coating material to them, it is also possible to deal easily with the manufacturing of short length tape core wires and with the coating of single core wires that extend out from a predetermined component.

Moreover, if, when the coating head is moving relatively to the respective single core wires on the coating jig, there is shaking in the coating head or coating jig during this relative movement, or there are irregularities in the smoothness that are due to bending of the coating jig or the like, the positioning in the thickness direction of the coating head is performed directly for the respective single core wires in the vicinity of the coating member. In addition, because any bending in the longitudinal direction of the coating jig is also absorbed by the coating head tilting in the longitudinal direction, a uniform coating can be applied to the respective single core wires without a high precision coating jig having to be used.

Moreover, in the first aspect of the present invention, the coating members comprise: coating layer-forming members that, when the position adjustment surface is pressed against the respective single core wires, form gaps equal to the thickness of the coating between themselves and the respective single core wires; discharging members that discharge the coating material; and coating layer-widening members that spread the discharged coating material in the transverse direction of the respective single core wires between the discharging member and the gap.

According to this structure, after being discharged from the discharging members the coating material is spread to a predetermined width by the coating layer-widening member and is spread to a predetermined thickness by the coating layer-forming members. As a result, a coating layer having a predetermined width and a predetermined thickness is formed. Namely, without it being necessary to enlarge the size of the discharging members, and without it consequently becoming difficult to adjust the quantity of coating material that is discharged from the discharging members, the coating width can be broadened comparatively easily while a uniform coating thickness is maintained by balancing the discharge quantity with the speed of relative movement of the coating head.

Moreover, in the first aspect of the present invention, the coating members are provided on both sides in the direction of relative movement of the coating head.

According to this structure, in a module component in which single core wires extend from both sides of a predetermined component, it is possible when applying a coating to these two single core wires to firstly apply a coating to one single core wire using one coating member while moving the coating head relatively in one direction, and to subsequently apply a coating to the other single core wire using the other coating member while moving the coating head relatively in the other direction. As a result, it is possible to apply a coating to the two single core wires from a position closest to the predetermined component, and the ability of this tape core wire manufacturing apparatus to be applied to a variety of module components can be improved.

Moreover, in the first aspect of the present invention, there is provided a wiring head that aligns and fixes the respective single core wires onto a processing sheet, and the wiring head includes: a core wire feeding unit that has a plurality of drums from which the respective single core wires are unwound; a core wire collecting unit that applies a predetermined tension to the respective single core wires and collects the single core wires; a sheet feeding unit that feeds the processing sheet used for adhering the respective single core wires thereon; and an aligning and fixing unit that, while moving relatively to the respective single core wires, arranges them into a row and adheres them onto the processing sheet.

Moreover, in the first aspect of the present invention, there is provided a sheet receiving unit that collects the processing sheet onto which the respective single core wires are adhered.

According to this structure, firstly, a plurality of single core wires are unwound by the core wire feeding unit and any slackness in the single core wires is taken up by the core wire collecting unit as the core wire collecting unit collects the single core wires. Meanwhile, the processing sheet is unwound by the sheet feeding unit and the respective single core wires are fixed in a straight row on the processing sheet by the aligning and fixing unit. Namely, it is possible to accurately place a plurality of the single core wires simultaneously and automatically on the processing sheet. In addition, the accuracy when the respective single core wires are coated can be increased and the yield can be improved.

Moreover, by winding the processing sheet onto which the respective single core wires have been fixed in a straight row onto the sheet receiving unit, the respective single core wires can be made and then left in their wired state. Namely, because the processing time of the wiring step to arrange the respective single core wires in a wire form is normally shorter than the coating step to apply the coating material thereto, by manufacturing and then storing the respective single core wires with the above-described two steps being performed non-consecutively as separate processes, the respective single core wires that are in wire form can later be grouped into further combinations. As a result, in cases such as when a large variety of tape core wires are being manufactured in a small quantity, the number of steps required for preparation and adjustments can be decreased and the overall throughput of the apparatus can be improved.

In order to attain the above-described objects, a second aspect of the present invention is a tape core wire wiring apparatus that, in a wiring apparatus for tape core wires that are formed by arranging a plurality of single core wires in a row and then coating them to form a single body, includes: a core wire feeding unit that has a plurality of drums from which the respective single core wires are unwound; a core wire collecting unit that applies a predetermined tension to the respective single core wires and collects the single core wires; a sheet feeding unit that feeds a processing sheet used for adhering the respective single core wires thereon; and an aligning and fixing unit that, while moving relatively to the respective single core wires, arranges them into a row and adheres them onto the processing sheet.

Moreover, in the second aspect of the present invention, there is provided a sheet receiving unit that collects the processing sheet onto which the respective single core wires have been adhered.

Moreover, the second aspect of the present invention is a tape core wire wiring method for a tape core wire produced by arranging a plurality of single core wires in a row and by coating these to form a single body, comprising: a core wire feeding step in which the respective single core wires are unwound from a plurality of drums; a core wire collecting step in which the single core wires are collected while a predetermined tension is applied to the respective single core wires; a sheet feeding step in which the processing sheet used for adhering the respective single core wires thereon is unwound; and an aligning and fixing step in which the respective single core wires are arranged in a row by moving relatively to these respective single core wires, and the respective single core wires are adhered onto the processing sheet.

Moreover, in the second aspect of the present invention, there is provided a sheet receiving step in which the processing sheet onto which the respective single core wires are adhered is wound up.

According to this structure, firstly, a plurality of single core wires are unwound by the core wire feeding unit (i.e., step) and any slackness in the single core wires is taken up by the core wire collecting unit (i.e., step) as the core wire collecting unit (i.e., step) collects the single core wires. Meanwhile, the processing sheet is unwound by the sheet feeding unit (i.e., step) and the respective single core wires are fixed in a straight row on the processing sheet by the aligning and fixing unit (i.e., step). Namely, it is possible to accurately place a plurality of the single core wires simultaneously and automatically on the processing sheet. In addition, the accuracy when the respective single core wires are coated can be increased and the yield can be improved.

Moreover, by winding the processing sheet onto which the respective single core wires have been fixed in a straight row onto the sheet receiving unit (i.e., step), the respective single core wires can be made and then left in their wired state. Namely, because the processing time of the wiring step to arrange the respective single core wires in a wire form is normally shorter than the coating step to apply the coating material thereto, by manufacturing and then storing the respective single core wires with the above-described two steps being performed non-consecutively as separate processes, the respective single core wires that are in wire form can later be grouped into further combinations. As a result, in cases such as when a large variety of tape core wires are being manufactured in a small quantity, the number of steps required for preparation and adjustments can be decreased and the overall throughput of the apparatus (i.e., of the steps as a whole) can be improved.

According to the first aspect of the present invention, the manufacturing of a large variety of tape core wires in small quantities can be accomplished with ease, and in addition, a uniform coating can be easily applied while equipment costs are kept in check.

Moreover, according to the first aspect of the present invention, it is also possible to apply a uniform coating over a broad width.

Moreover, according to the first aspect of the present invention, it is also possible to improve the ease with which a large variety of tape core wires in small quantities can be dealt with.

Moreover, according to the first aspect of the present invention, by improving the yield of tape core wires and also improving throughput, it is possible to efficiently manufacture tape core wires even when a large variety of these are being manufactured in small quantities.

Moreover, according to the second aspect of the present invention, by improving the yield of tape core wires and also improving throughput, it is possible to efficiently manufacture tape core wires even when a large variety of these are being manufactured in small quantities.

DETAILED DESCRIPTION OF THE INVENTION

An embodiment of the present invention will now be described with reference made to the drawings. Note that in the drawings an arrow FR, an arrow LH, and an arrow UP in the description refer respectively to a forward direction, a left-hand direction, and an upward direction.

Figure 1:
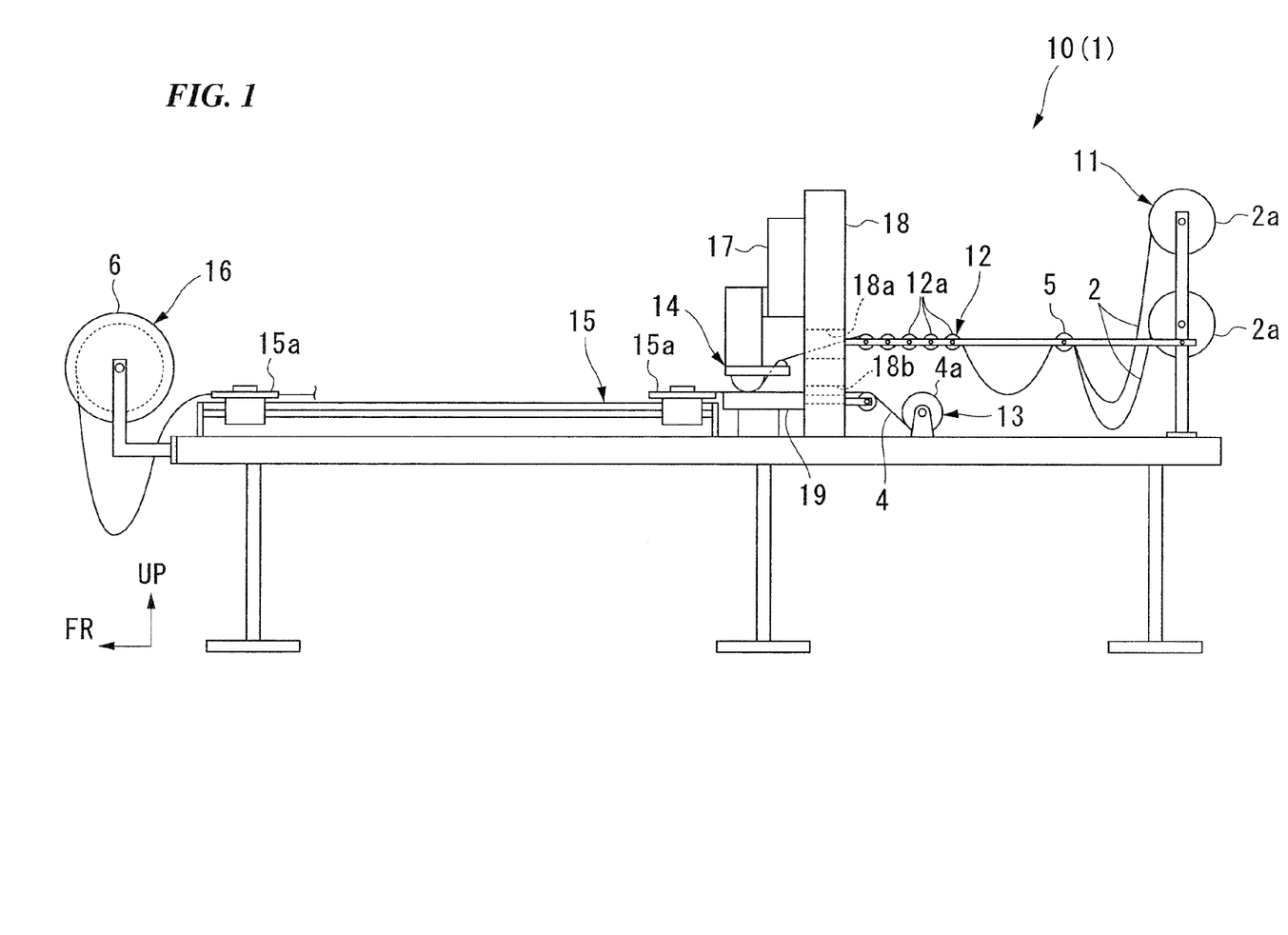
FIG. 1 is a side view of a wiring apparatus of a tape core wire manufacturing apparatus according to an embodiment of the present invention.
Figure 5:
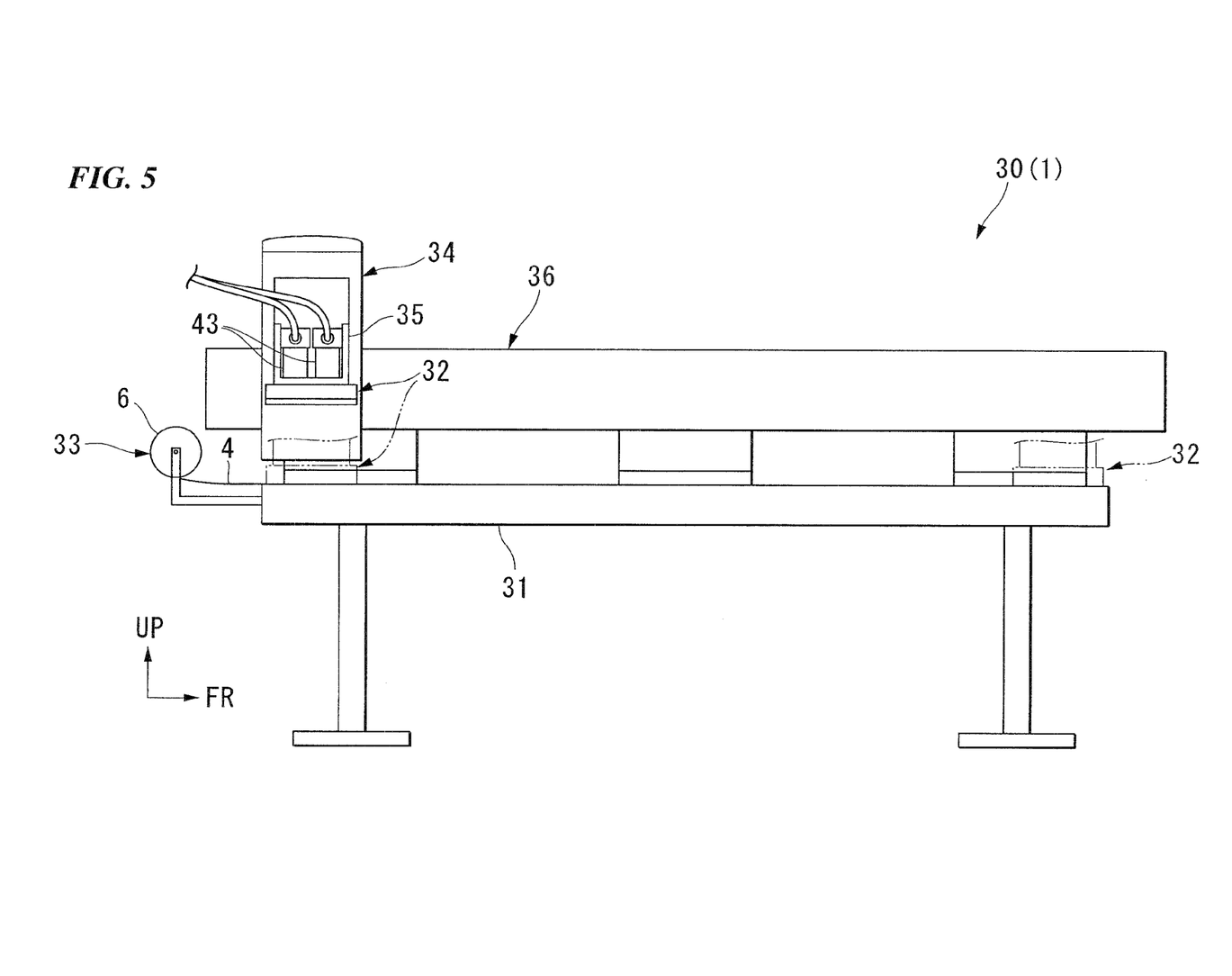
FIG. 5 is a side view of a coating apparatus of the above tape core wire manufacturing apparatus.

As is shown in FIGS. 1 and 5, a tape core wire manufacturing apparatus 1 of the present embodiment is used to arrange a plurality of optical fiber core wires (i.e., single core wires) 2 in a row and to manufacture a tape core wire that is formed by coating these as a single body. This tape core wire manufacturing apparatus 1 is formed principally by a wiring apparatus 10 shown in FIG. 1 and a coating apparatus 30 shown in FIG. 5. In this embodiment, the wiring step that is performed by the wiring apparatus 10 and the coating step that is performed by the coating apparatus 30 are separate steps, and the respective apparatuses can be simplified in contrast to a large scale apparatus that performs these steps continuously.

As is shown in FIG. 1, the wiring apparatus 10 is used to fix the plurality of optical fiber core wires 2 in a row on a processing sheet 4 and is provided with a core wire feeding apparatus (i.e., a core wire feeding unit) 11 that has a plurality of drums 2a from which the respective optical fiber core wires 2 are unwound, a core wire collecting apparatus (i.e., a core wire collecting unit) 12 that imparts a predetermined tension to the respective optical fiber core wires 2 that had been hanging loosely and then collects the optical fiber core wires 2, a sheet feeding apparatus (i.e., a sheet feeding unit) 13 from which is unwound the processing sheet 4 onto which are adhered the respective optical fiber core wires 2, a wiring head (i.e., an aligning and fixing unit) 14 that adheres each of the relatively moving optical fiber core wires 2 onto the processing sheet 4 while arranging them into a row at the same time, a moving apparatus 15 that pulls the respective optical fiber cores wires 2 and the processing sheet 4 so as to cause the respective optical fiber core wires 2 to move relatively to the wiring head 14, and a sheet receiving apparatus (i.e., a sheet receiving unit) 16 onto which is wound the processing sheet 4 onto which the respective optical fiber core wires 2 have been adhered.

The respective optical fiber core wires 2 that are unwound from each of the drums 2a pass through the core wire collecting apparatus 12 and the wiring head 14 and then extend forwards so as to be held on a tray 15a of the moving apparatus 15. As a result of the tray 15a then moving forward, the respective optical fiber core wires 2 are pulled forward via the core wire collecting apparatus 12 and the wiring head 14 from a state in which they are hanging loosely immediately after being unwound from the respective drums 2a so that this looseness is eliminated, and the respective optical fiber core wires 2 are arranged such that the optical fiber core wires 2 are in close contact with each other.

Figure 2:
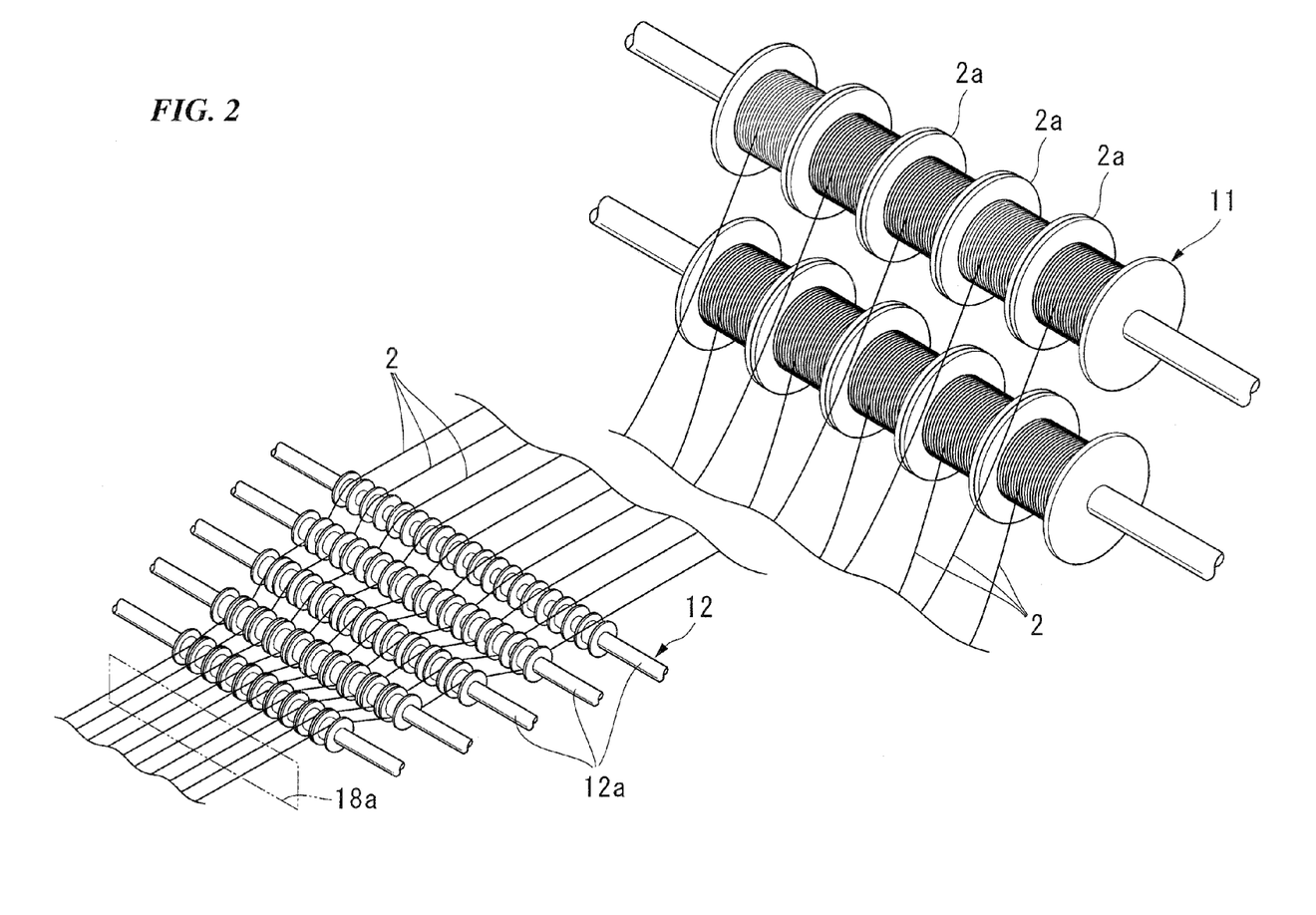
FIG. 2 is a perspective view of a core wire unwinding apparatus and a core wire collecting apparatus of the above wiring apparatus.

As is shown in FIG. 2, the core wire feeding apparatus 11 drives, for example, 10 drums 2a using a driving unit (not shown) so that the respective optical fiber core wires 2 that are wound onto the respective drums 2a are unwound at a predetermined speed. The respective optical fiber core wires 2 that are unwound from the respective drums 2a maintain their loose state due to a looseness imparting bar 5 and, from this state, are fed forward to the core wire collecting apparatus 12 that has, for example, five guide bars 12a. The respective optical fiber core wires 2 are then weaved between each of the guide bars 12a.

At this time, at the same time as a predetermined tension is applied to the respective optical fiber core wires 2, they are collected gradually and uniformly substantially in a center portion in a left-right direction. The respective optical fiber core wires 2 that have been collected in this manner are made to pass through an upper through-hole 18a in a frame 18 that supports an elevator apparatus 17 for raising and lowering the wiring head 14. The respective optical fiber core wires 2 are then passed forward through the wiring head 14 and are adhered onto the processing sheet 4 on a wiring jig 19 that is located below the wiring head 14.

In contrast, the sheet feeding apparatus 13 that is located, for example, below the core wire collecting apparatus 12 drives a sheet roll 4*a* using a driving unit (not shown) so that the processing sheet 4 is unwound at a predetermined speed. The speed at which this processing sheet 4 is unwound is approximately the same as the feeding speed of the core wire feeding apparatus 11. The processing sheet 4 that has been unwound from the sheet roll 4*a* passes through a lower through-hole 18*b* of the frame 18 and is then forwarded onto the wiring jig 19. The processing sheet 4 may be, for example, an existing craft tape that is made from paper and that has one adhesive surface and one releasing surface. This processing sheet 4 is placed on the wiring jig 19 with the adhesive surface thereof facing upwards, and the respective optical fiber core wires 2 are adhered onto this adhesive surface while the processing sheet 4 is placed on the wiring jig 19.

Figure 3:
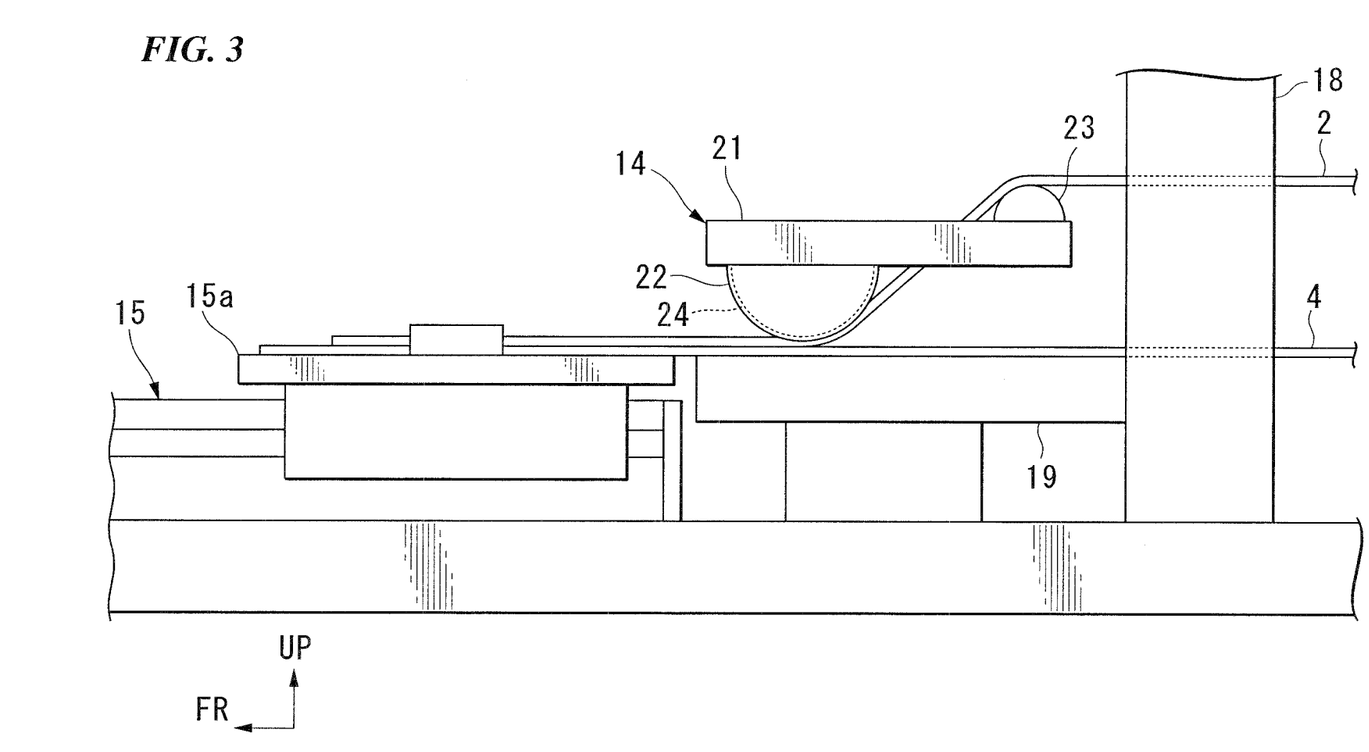
FIG. 3 is a side view of the vicinity of a wiring head of the wiring apparatus.
Figure 4:
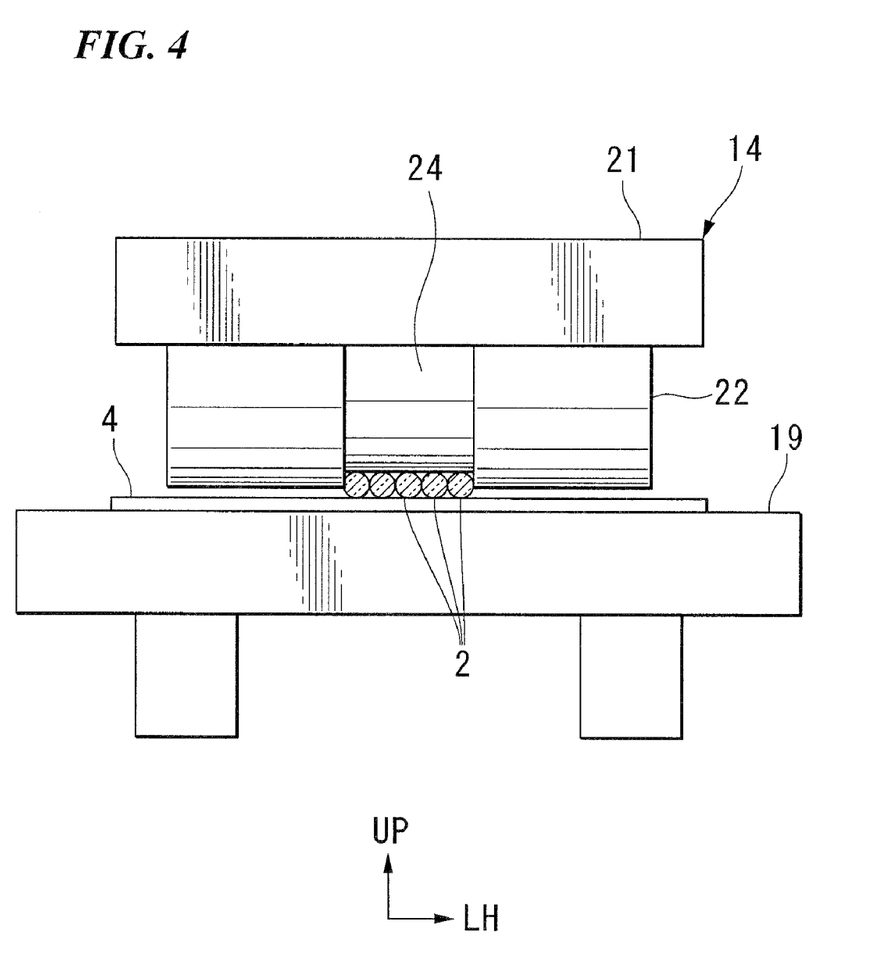
FIG. 4 is a frontal view of the vicinity of the wiring head.

As is shown in FIGS. 3 and 4, the wiring head 14 is formed by a substantially horizontal plate-shaped base member 21, a head body 22 that protrudes downwards from a front side of the bottom surface of the base member 21, and an auxiliary head 23 that protrudes upwards from a rear side of the top surface of the base member 21. The head body 22 and the auxiliary head 23 have a convex semicircular cross section that protrudes downwards or upwards, and are formed in a half columnar shape that extends in a left-right direction. In addition, the auxiliary head 23 has a smaller diameter than that of the auxiliary head 23.

The respective optical fiber core wires 2 that are passed through the core wire collecting apparatus 12 and are collected extend substantially forwards from the core wire collecting apparatus 12. From this state, they are firstly wound from above over the auxiliary head 23 and are bent so as to be directed obliquely downwards and forwards. Next, they are wound from below over the head body 22 and are bent forwards so that they become wound onto the wiring head 14. A guide groove 24 is cut in a center portion in the left-right direction of the head body 22 so as to extend in the circumferential direction thereof, and as a result of the respective optical fiber core wires 2 sliding along this guide groove 24, they become aligned in tight contact with each other. Namely, the width of the guide groove 24 is substantially the same as the overall width of the respective optical fiber core wires 2 when they are arranged in a row.

Here, the head body 22 moves away from the wiring jig 19 when the wiring head 14 is moved upwards by the elevator apparatus 17, and is pressed towards the wiring jig 19 side when the wiring head 14 is moved downwards. Namely, the wiring head 14 is elastically supported against a load applied from below, and when the wiring head 14 is moved downwards by the elevator apparatus 17, the head body 22 is elastically pressed towards the wiring jig 19 side and is urged downwards.

The depth of the guide groove 24 of the head body 22 is approximately the same as the radius of the respective optical fiber core wires 2. When the head body 22 is pressed towards the wiring jig 19 side, the respective optical fiber core wires 2 that are placed on the wiring jig 19 are pressed against the adhesive surface of the processing sheet 4 that is located underneath and become adhered thereto while remaining aligned in the a row. Moreover, the head body 22 is also able to draw the adhesive sheet 4 and the respective optical fiber core wires 2 that are adhered thereto away from the wiring jig 19 without the head body 22 coming into contact with the adhesive surface of the processing sheet 4.

After passing through the wiring head 14, the respective optical fiber core wires 2 are held together with the processing sheet 4 on the tray 15*a* of the moving apparatus 15 that is in front of the wiring jig 19. The respective optical fiber core wires 2 are then pulled forward by the movement of the tray 15*a* so that they become aligned in a row while passing through the guide groove 24 on the wiring jig 19. The respective optical fiber core wires then become pressed tightly against each other on the processing sheet 4 that is also being pulled by the tray 15*a* and become successively fixed in a row while their rectilinearity is maintained.

At this time, by providing the auxiliary head 23 immediately in front of the head body 22 and winding the respective optical fiber core wires 2 in an S shape (when viewed from the side) using the auxiliary head 23 and the head body 22, a predetermined tension is applied thereto directly in front of the comparatively shallow guide groove 24 so that it is difficult for the respective optical fiber core wires 2 to jump out of the guide groove 24.

After the tray 15*a* has moved to its forward limit position, the holding of the respective optical fiber core wires and the processing sheet 4 is temporarily released, and the tray 15*a* alone is restored to its initial position directly in front of the wiring jig 19. Subsequently, the respective optical fiber core wires 2 and the processing sheet 4 are once again held on the tray 15*a* and the above-described wiring steps may be repeated.

In this manner, after the respective optical fiber core wires 2 have been successively fixed in a row on the processing sheet 4, they are successively wound onto the drum 6 by the sheet receiving apparatus 16.

The respective optical fiber core wires 2 that have been fixed in a row on the processing sheet 4 by the above-described wiring apparatus 10 are transported to the coating apparatus 30 while remaining wound on the drum 6 together with the processing sheet 4. A coating step is then performed on the coating apparatus 30 using, for example, a coating material 7 such as a silicone-based rubber.

As is shown in FIG. 5, the coating apparatus 30 has a coating jig 31 that extends in the longitudinal direction. Once the respective optical fiber core wires 2 have been placed on the coating jig 31 such that their longitudinal directions are the same, a coating head 32 is moved in the longitudinal direction relatively to the respective optical fiber core wires 2 while the coating material 7 (see FIG. 6) is coated by the coating apparatus 32 on the top surface side of the respective optical fiber core wires 2 that are shaped like a tape.

Here, by using a rubber-based resin material such as a silicone-based rubber or the like for the coating material 7, flexibility and tear workability, which are the advantages of single-surface coating, are preserved while ensuring that the respective optical fiber core wires 2 are protected. In addition, the tape core wires can be easily made into a fan-out structure (i.e., a distributed structure). Moreover, if a cold setting material is used for the coating material 7, then the curing step is greatly simplified compared with when a thermosetting resin or ultraviolet-curable resin is used. Note that it may also be possible for a flexible coating material 7 other than a rubber-based resin material to be employed for the coating material 7, however, a rubber-based resin material such as a silicone-based rubber or butyl rubber that can be easily peeled after curing and can be easily molded is more preferable.

A sheet feeding apparatus 33 that unwinds the processing sheet 4 from the drum 6 onto which the processing sheet 4 having the respective optical fiber core wires 2 fixed in a row thereon has been wound is provided at a rear end portion of the coating jig 31. The processing sheet 4 that is unwound from the sheet feeding apparatus 33 is stretched out and temporarily fixed by a holding apparatus (not shown) onto the coating jig 31.

Figure 6:
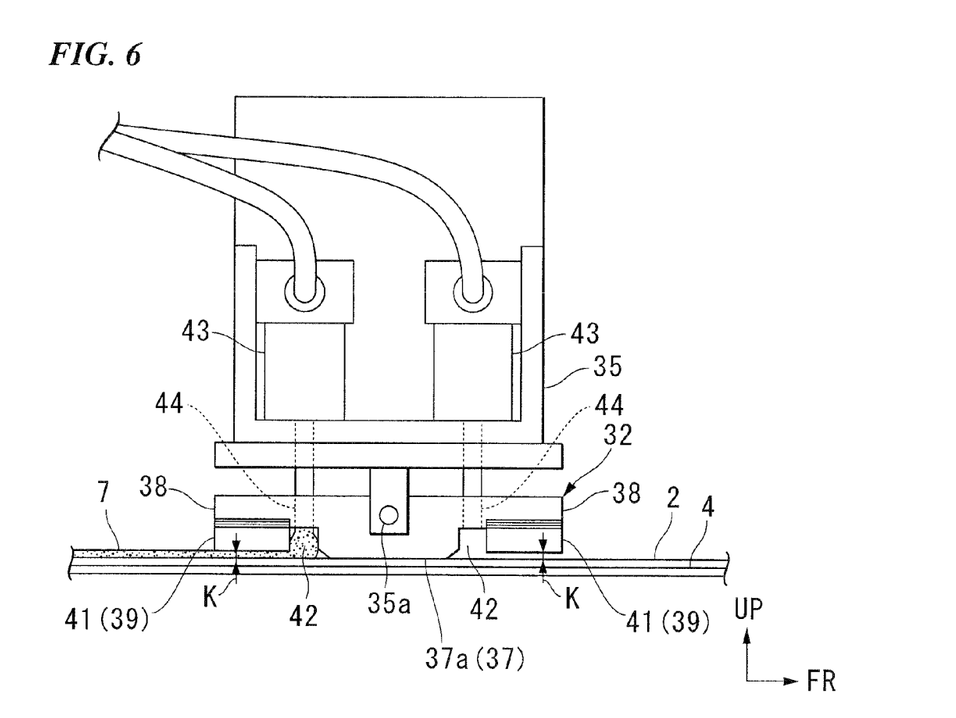
FIG. 6 is a side view of the vicinity of a coating head of the above coating apparatus.
Figure 7:
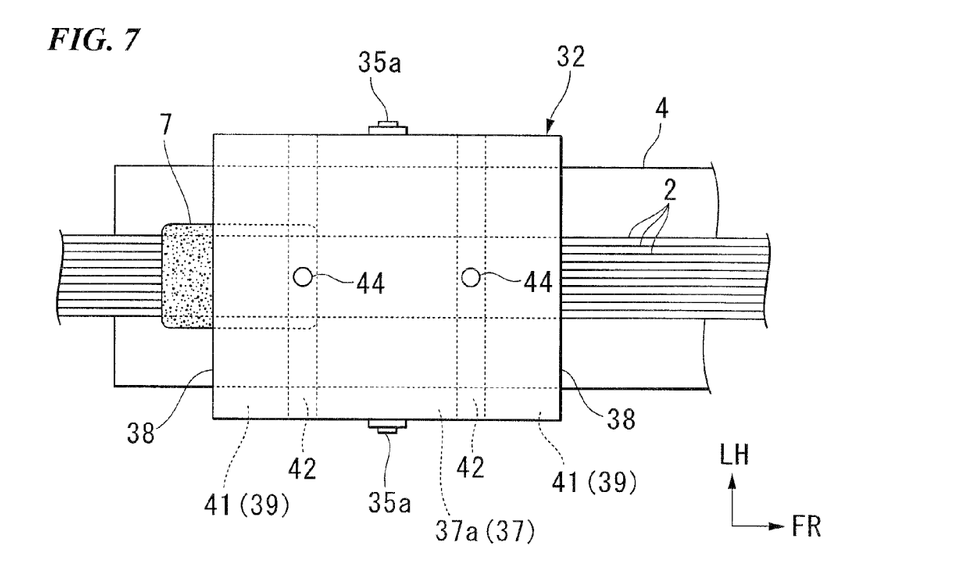
FIG. 7 is a top view of the vicinity of the above coating head.

As is shown in FIGS. 6 and 7, a coating head 32 is supported via a shaft 35a that is substantially parallel with the transverse direction of the respective optical fiber core wires 2, which are formed in a tape shape, by a head supporting member 35 of an elevator apparatus 34. When viewed from above, the coating head 32 has a rectangular shape that is wider than the processing sheet 4, and is provided such that it can tilt in a longitudinal direction, namely, can tilt in its own direction of movement. In addition, coating members 39 that apply the coating material 7 are provided on two sides in the longitudinal direction of the coating head 32. The coating head 32 is also supported by a moving apparatus 36 that makes it possible for the coating head 32 to move in the longitudinal direction together with the elevator apparatus 34. Accordingly, the coating head 32 is able to move between the front and rear end portions of the coating jig 31, and is also able to move up or down at an optional position within this range of movement.

The bottom surface on the center side in the longitudinal direction of the head body 22 of the coating head 32 is formed as a substantially horizontal position adjustment surface 37a that is used to regulate the position in the thickness direction (i.e., a vertical direction) and the tilt in the longitudinal direction of the coating head 32. When the coating head 32 is moved upwards by the elevator apparatus 34, the position adjustment surface 37a moves away from the respective optical fiber core wires 2 that have been placed on the coating jig 31. When the coating head 32 is moved downwards, the coating head 32 is pushed against the respective optical fiber core wires 2. Namely, the coating head 32 is elastically supported against a load that is applied from below, and when it is moved downwards by the elevator apparatus 34, the position adjustment surface 37a thereof is elastically pressed against the respective optical fiber core wires 2 and becomes urged downwards.

Figure 8:
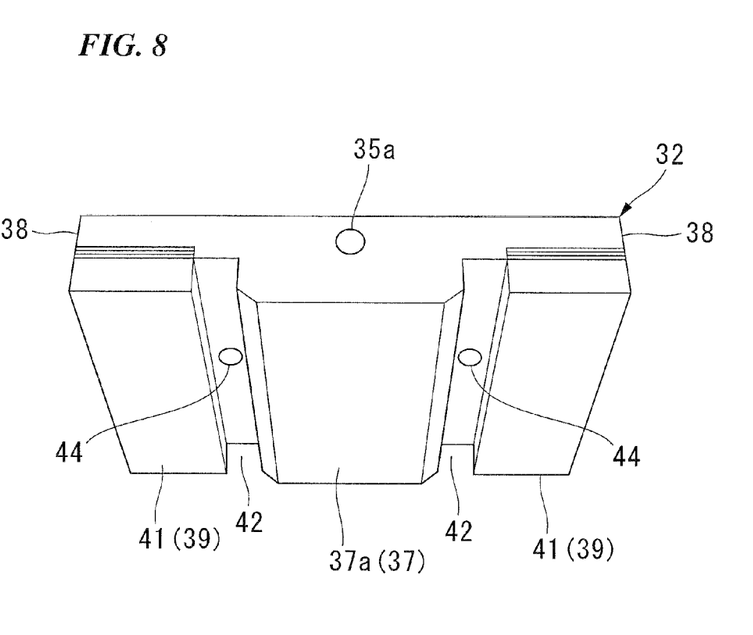
FIG. 8 is a perspective view as seen from an obliquely downward direction of the coating head.

As is also shown in FIG. 8, both side portions in the longitudinal direction of the head body 22 are formed as flange members 38 whose bottom surfaces are displaced so as to be higher than the position adjustment surface 37a. Plate-shaped blades (i.e., coating layer-forming members) 41 that extend in the transverse direction are attached to the bottom surface sides of the two flange members 38. Bottom surfaces of each of these blades 41 are parallel with the position adjustment surface 37a. When the position adjustment surface 37a is pressing against the respective optical fiber core wires 2, gaps K that equal the thickness of the coating of the coating material 7 (i.e., approximately 30 to 500 μm) are formed between the bottom surfaces of the blades 41 and the respective optical fiber core wires 2 that are placed on the coating jig 31.

In addition, material circulation grooves (i.e., coating layer-widening members) 42 that have a predetermined longitudinal width are formed between the respective blades 41 and the position on the head body 22 where the position adjustment surface 37a is formed (this position will be referred to hereinafter simply as the position adjustment surface 37a). Note that the gaps K can be adjusted using shims that are inserted between the top surfaces of the respective blades 41 and the bottom surfaces of the flange members 38.

The respective material circulation grooves 42 may be provided extending, for example, across the entire width in the left-right direction of the head body 22. In addition, distal ends of nozzles (i.e., discharge apertures) 44 that extend from a pair of dispenser barrels 43 that are located in the head supporting member 35 each open in substantially a center portion in the left-right direction of the respective material circulation grooves 42.

The coating material 7 that is discharged from the respective nozzles 44 has a predetermined viscosity. When this coating material 7 is discharged into the material circulation grooves 42, then, depending on the discharge quantity or the like, it spreads inside the material circulation grooves 42 in the longitudinal direction thereof (i.e., in the transverse direction of the respective optical fiber core wires 2 that are in a tape shape) prior to it entering into the comparatively narrow gaps K. If the coating head 32 then moves in the longitudinal direction while the coating material 7 is spread out in this manner, the coating material 7 is spread by the blades 41 to a coating thickness that is equal to the gaps K and is applied to the respective optical fiber core wires 2 at a predetermined coating width. Namely, the coating members 39 are formed by the nozzles 44, the material circulation grooves 42, and the blades 41.

The coating width can be adjusted by adjusting the quantity of the coating material 7 that is discharged and the traveling speed of the coating head 32 and the like. At its maximum, the coating width can be widened to almost the entire length of the material circulation grooves 44, namely, to almost the entire width in the left-right direction of the coating head 32. Namely, irrespective of the diameter and aperture shape of the nozzles 44, the coating material 7 can be applied over a broad width to the respective optical fiber core wires 2.

The coating width is normally set to be wider than the overall width of the respective optical fiber core wires 2 when they are formed into a tape. It is thereby possible to absorb any mispositioning in the transverse direction that occurs when the respective optical fiber core wires 2 are taken from the wiring apparatus 10 and reset in the coating apparatus 30. However, in this embodiment, by resetting the respective optical fiber core wires 2 in the coating apparatus 30 while they are fixed in a row on the processing sheet 4, the actual possibility of any mispositioning occurring is itself greatly decreased compared with the case in which the respective optical fiber core wires 2 are set directly on the coating jig 31. In addition, excellent contact between the respective optical fiber core wires 2 as well as the rectilinearity thereof can be ensured. Note that the overall width of the processing sheet 4 is wider than the overall width of the respective optical fiber core wires 2 when they are in the form of a tape, and the processing sheet 4 also functions as a mounting board when the coating material 7 is applied to the respective optical fiber core wires 2.

After the coating material 7 is applied to the respective optical fiber core wires 2, the fixing of the respective optical fiber core wires 2 onto the coating jig 31 is temporarily suspended, and they are transported to a curing step (not shown) where the coating material is cured.

After the coating material 7 is cured, the respective optical fiber core wires 2 which have one surface that has been coated with the coating material 7 to form a single body (namely, the tape core wire) are peeled from the processing sheet 4 and removed.

At this time, if the coating material 7 is torn between the optical fiber core wires 2 and the processing sheet 4 on both sides in the transverse direction, then tear fragments of the coating material 7 may remain on both sides in the transverse direction of the respective optical fiber core wires 2. These tear fragments may be cut off using a cutter or the like, or else they may be removed by tearing off the outermost optical fiber core wire 2 on each side. If the outermost optical fiber core wire 2 on each side is to be torn off, then it is possible to perform the coating with an extra optical fiber core wire 2 for tearing off added on, or to perform the coating with a dummy wire having the same diameter added on.

Here, a description is given of a movement of the coating head 32 from the rear side towards the front side of the coating jig 31 (i.e., a movement from the left side to the right side in FIGS. 5 and 6). In the coating head 32, one coating member 39 is positioned on the downstream side in the aforementioned movement direction of a position adjustment member 37. More specifically, the blade 41 is positioned on the downstream side in the aforementioned movement direction of the position adjustment member 37, and one nozzle 44 is positioned on the upstream side in the movement direction of the blade 41 (i.e., between the blade 41 and the position adjustment member 37). One material circulation groove 42 which extends in the transverse direction of the respective optical fiber core wires 2 when they are formed as a tape is positioned between this nozzle 44 and the gap K beneath the blade 41.

In the coating apparatus 30, normally, the coating material 7 is applied to the respective optical fiber core wires 2 that have been placed on the coating jig 31 using the coating member 39 (i.e., the blade 41, the nozzle 44, and the material circulation groove 42) that is positioned on the downstream side in the movement direction while, as is described above, the coating head 32 is moved from the front side to the rear side (see FIG. 6).

Figure 9:
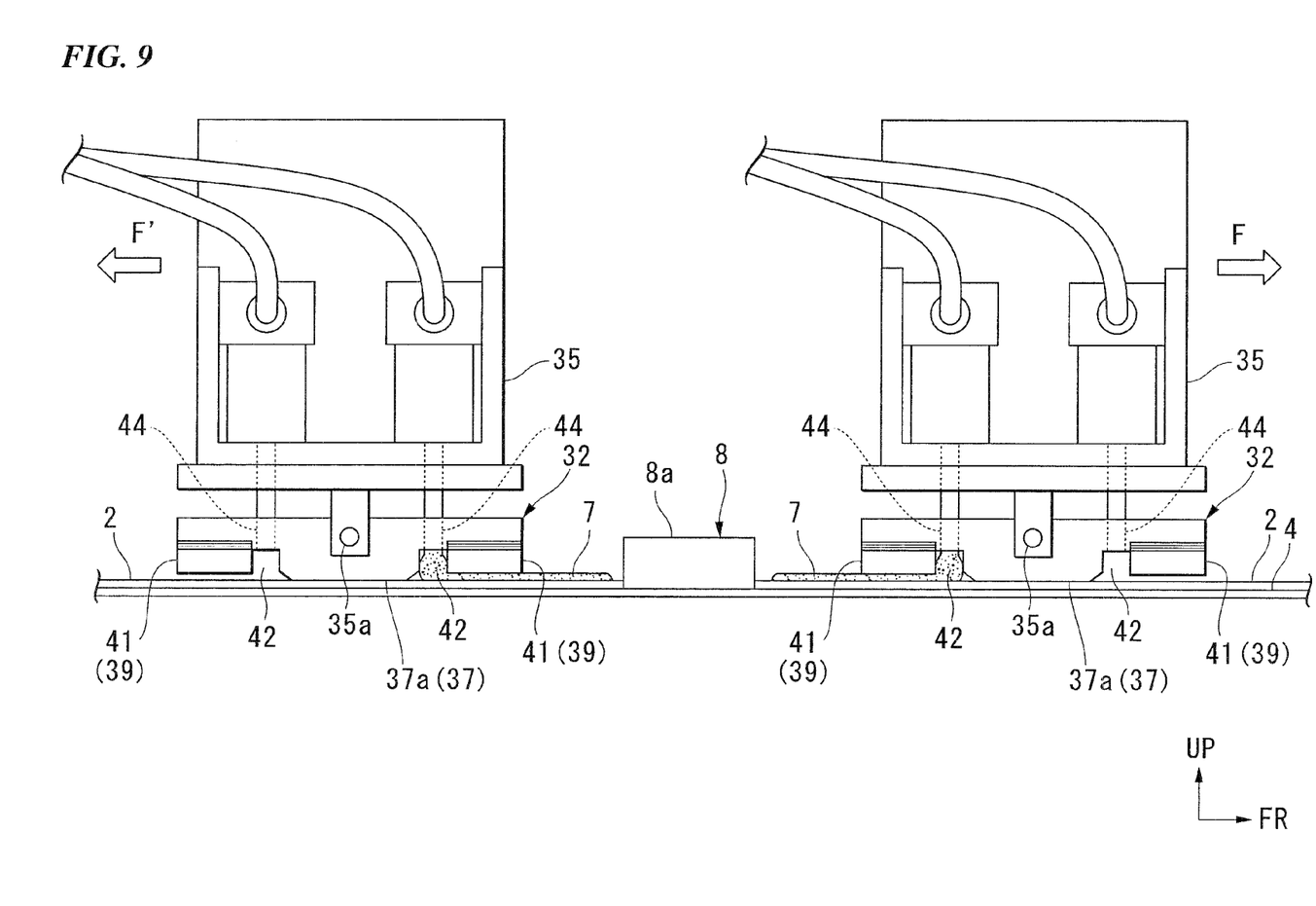
FIG. 9 is a side view illustrating a coating step to coat a wire of a module component.

However, as is shown in FIG. 9, when a coating is applied, in particular, to the two optical fiber core wires 2 which extend from both sides of an optical component 8a such as an optical coupler, an optical multiplexer, or the like in a module optical component 8, the coating material 7 is applied thereto by also using the other coating member 39 that is positioned on the upstream side in the movement direction.

Namely, after the two optical fiber core wires 2 have been temporarily fixed on the coating jig 31 with the longitudinal directions thereof aligned in the same direction (if necessary, in a state of being adhered onto the processing sheet 4), when the coating material 7 is applied firstly to the optical fiber core wire 2 that is positioned on the downstream side in the movement direction of the optical component 8a, then from a state in which the blade 41 of the coating member 39 that is positioned on the upstream side in the direction of movement has been moved to a position directly in front of the optical component 8a, the coating material 7 is applied by using the coating member 39 on the upstream side while the coating head 32 is moved in the direction of movement (shown by the arrow F in FIG. 9). As a result, the coating can be applied to the optical fiber core wire 2 from directly in front of the optical component 8a.

Next, when the coating material 7 is applied to the optical fiber core wire 2 that is positioned on the upstream side in the movement direction of the optical component 8a, then from a state in which the blade 41 of the coating member 39 that is positioned on the downstream side in the direction of movement has been moved to a position directly behind the optical component 8a, the coating material 7 is applied by using the coating member 39 on the downstream side while the coating head 32 is moved in the opposite direction from the direction of movement (shown by the arrow F' in FIG. 9). As a result, the coating can be applied to the optical fiber core wire 2 from directly behind the optical component 8a.

(Tape Core Wire Manufacturing Apparatus)

As has been described above using the drawings, in the tape core wire manufacturing apparatus 1 of the present embodiment, the coating apparatus 30 that applies the coating material 7 to the respective optical fiber core wires 2 has a coating head 32 that moves in the longitudinal direction thereof relatively to the respective optical fiber core wires 2 that have been placed in a row on the coating jig 31, and this coating head 32 has a position adjustment surface 37a in the thickness direction of the respective optical fiber core wires 2 having a tape shape in the vicinity of the coating member 39 of the coating head 32, and this position adjustment surface 37a is pressed against the respective optical fiber core wires 2. The coating head 32 is also provided so as to be able to be tilted in the longitudinal direction.

According to this structure, compared with the case in which the respective optical fiber core wires 2 are coated while they are being transported, by placing the respective optical fiber core wires 2 in a row on the coating jig 31 and then applying the coating material 7 thereto, this structure makes it possible to reduce the excess length that is needed to wind on or unwind the optical fiber core wires 2. As a result, this structure provides an excellent yield even when short lengths of tape core wire are being manufactured. Moreover, even if the coating material is applied to optical fiber core wires 2 that extend out from the optical component 8a, the coating material can be easily applied by placing the optical fiber core wires 2 on the coating jig 31.

Furthermore, if, when the coating head 32 is moving relatively to the respective optical fiber core wires 2 on the coating jig 31, there is shaking in the coating head 32 or coating jig 31 during this relative movement, or there are irregularities in the smoothness that are due to bending of the coating jig 31 or the like, the positioning in the thickness direction of the coating head 32 is performed directly for the respective optical fiber core wires 2 adjacent to the coating members 39. In addition, because any bending in the longitudinal direction of the coating jig 31 is also absorbed by the coating head 32 tilting in the longitudinal direction, equipment costs can be kept in check as a high precision coating jig 31 does not need to be used. Moreover, the minute gap K between the respective optical fiber core wires 2 and the blades 41 can be accurately maintained, and a uniform coating can be applied to the respective optical fiber core wires 2.

Furthermore, in the above-described tape core wire manufacturing apparatus 1, in the coating section 39 there are provided the blades 41 that form the gap K for the coating thickness between themselves and the respective optical fiber core wires 2 when the position adjustment surface 37a is pressed against the respective optical fiber core wires 2, the discharge nozzles 44 that discharge the coating material 7, and the material circulation grooves 42 that spread the discharged coating material 7 over the transverse direction of the respective optical fiber core wires 2 when they are in tape form between the nozzles 44 and the gap K.

According to this structure, after being discharged from the nozzles 44, the coating material 7 is spread to a predetermined width by the material circulation grooves 42 and is spread to a predetermined thickness by the blades 41. As a result, a coating layer having the predetermined width and the predetermined thickness is formed. Namely, without it being necessary to enlarge the size of the nozzles 44, and without it consequently becoming difficult to adjust the quantity of coating material discharged from the nozzles 44, the coating width can be broadened comparatively easily while a uniform coating thickness is maintained by balancing the discharge quantity with the speed of relative movement of the coating head 32.

Furthermore, in the above-described tape core wire manufacturing apparatus 1, by providing the coating members 39 on both sides in the direction of relative movement of the coating head 32, in the module component 8 in which the optical fiber core wires 2 extend out from both sides of a predetermined optical component 8a, it is possible when applying a coating to these two optical fiber core wires 2 to firstly apply a coating to one optical fiber core wire 2 using one coating member 39 while moving the coating head 32 relatively in one direction, and to subsequently apply a coating to the other optical fiber core wire 2 using the other coating member 39 while moving the coating head 32 relatively in the other direction. As a result, it is possible to apply a coating to the two optical fiber core wires 2 from a position closest to the optical component 8a, and the ability of the tape core wire manufacturing apparatus to be applied to a variety of module components 8 can be improved.

Moreover, in the above-described tape core wire manufacturing apparatus 1, the wiring apparatus 10 that fixes the respective optical fiber core wires 2 in a row on the processing sheet 4 has the core wire feeding apparatus 11 that has a plurality of drums from which the respective optical fiber core wires 2 are unwound, the core wire collecting apparatus 12 that applies a predetermined tension to the respective optical fiber core wires 2 and then collects the optical fiber core wires 2, the sheet feeding apparatus 13 that feeds the processing sheet 4 used for adhering the respective optical fiber core wires 2 thereon, the wiring head 14 that while moving relatively to optical fiber core wires 2 arranges them into a row and adheres them onto the processing sheet 4, and a sheet receiving apparatus 16 that collects the processing sheet 4 onto which the respective optical fiber core wires 2 have been adhered.

The above-described structure makes the following operation possible. Namely, firstly, a plurality of optical fiber core wires 2 are unwound by the core wire feeding apparatus 11 and any slackness in the optical fiber core wires 2 is taken up by the core wire collecting apparatus 12 as the core wire collecting apparatus 12 collects the optical fiber core wires 2. Meanwhile, the processing sheet 4 is unwound by the sheet feeding apparatus 13 and the respective optical fiber core wires 2 are fixed in a straight row on the processing sheet 4 by the wiring head 14. Namely, it is possible to accurately place a plurality of the optical fiber core wires 2 simultaneously and automatically on the processing sheet 4. In addition, the accuracy when the respective optical fiber core wires 2 are coated can be increased and the yield can be improved.

Moreover, by winding the processing sheet 4 onto which the respective optical fiber core wires 2 have been fixed in a straight row by the sheet receiving apparatus 16, the respective optical fiber core wires 2 can be made and then left in their wired state. Namely, because the processing time of the wiring step to arrange the respective optical fiber core wires 2 in a wire form is normally shorter than the coating step to apply the coating material 7 thereto, by manufacturing and then storing the respective optical fiber core wires 2 with the above-described two steps being performed non-consecutively as separate processes, the respective optical fiber core wires 2 that are in wire form can later be grouped into further combinations. As a result, in cases such as when a large variety of tape core wires are being manufactured in a small quantity, the number of steps required for preparation and adjustments can be decreased and the overall throughput of the apparatus can be improved.

Note that the present invention is not limited to the above-described embodiment and it is also possible, for example, to leave the processing sheet 4 on which the respective optical fiber core wires 2 have been fixed in a row unwound when transporting it to the coating apparatus, and to perform the wiring step and the coating step consecutively. In this case, the structure can be applied not only to the manufacturing of short-length tape core wires and the coating of module components, but also to the manufacturing of extended-length tape core wires.

Moreover, in the above-described wiring apparatus 10, it is also possible for the wiring head 14 to be moved relatively to the respective optical fiber core wires 2, and in the same way, in the coating apparatus 30, it is also possible for the respective optical fiber core wires 2 to be moved relatively to the coating head 32.

Furthermore, in the above-described coating apparatus 30, after forming a wide tape core wire, if this is torn so as to be separated into a desired number of tape core wires, then the throughput can be improved even further. Moreover, the above-described structure makes it possible to apply coatings to the respective optical fiber core wires 2 in two directions by providing coating members 39 on both sides in the direction of relative movement of the coating head 32, however, it is also possible to employ a structure in which, by making it possible to reverse the orientation of the respective optical fiber core wires 2 relative to the coating head 32 by rotating, for example, the coating head 32 or the coating jig 31, it becomes possible to apply a coating in two directions to the respective optical fiber core wires 2.

Here, the respective movable members of the above-described tape core wire manufacturing apparatus 1, namely, the core wire feeding apparatus 11, the sheet feeding apparatus 13, the elevator apparatus 17, the moving apparatus 15, the sheet receiving apparatus 16 or the like that are shown in FIG. 1 can be controlled automatically by a personal computer or the like so as to be in synchronization with each other. This case also falls within the scope of the present invention. In the same way, the sheet feeding apparatus 33, the elevator apparatus 34, the moving apparatus 36, and the dispenser or the dispenser barrels 43 that are shown in FIG. 5 can be controlled automatically by a personal computer or the like so as to be in synchronization with each other. This case also falls within the scope of the present invention.

(Tape Core Wire Wiring Apparatus)

As has been-described above using the drawings, the tape core wire wiring apparatus 10 of the above-described embodiment is provided with the core wire feeding apparatus 11 that has a plurality of drums from which the respective optical fiber core wires 2 are unwound, the core wire collecting apparatus 12 that applies a predetermined tension to the respective optical fiber core wires 2 and then collects the optical fiber core wires 2, the sheet feeding apparatus 13 that feeds the processing sheet 4 used for adhering the respective optical fiber core wires 2 thereon, the wiring head 14 that while moving relatively to optical fiber core wires 2 arranges them into a row and adheres them onto the processing sheet 4, and a sheet receiving apparatus 16 that collects the processing sheet 4 onto which the respective optical fiber core wires 2 have been adhered.

In other words, a tape core wire wiring method according to the above-described embodiment is provided with a core wire feeding step in which the respective optical fiber core wires 2 are unwound from a plurality of drums, a core wire collecting step in which a predetermined tension is applied to the respective optical fiber core wires 2 and the optical fiber core wires 2 are then collected, a sheet feeding step in which the processing sheet 4 used for adhering the respective optical fiber core wires 2 thereon is unwound, an aligning and fixing step in which while the optical fiber core wires 2 are moved relatively they are arranged into a row and are adhered onto the processing sheet 4, and a sheet receiving step in which the processing sheet 4 onto which the respective optical fiber core wires 2 have been adhered is wound up.

The above-described structure makes the following operation possible. Namely, firstly, a plurality of optical fiber core wires 2 are unwound by the core wire feeding apparatus 11 (i.e., the core wire feeding step) and any slackness in the optical fiber core wires 2 is taken up by the core wire collecting apparatus 12 as the core wire collecting apparatus 12 collects the optical fiber core wires 2 (i.e., the core wire collecting step). Meanwhile, the processing sheet 4 is unwound by the sheet feeding apparatus 13 (i.e., the sheet feeding step) and the respective optical fiber core wires 2 are fixed in a straight row on the processing sheet 4 by the wiring head 14 (i.e., the aligning and fixing step). Namely, it is possible to accurately place a plurality of optical fiber core wires 2 simultaneously and automatically on the processing sheet 4. In addition, the accuracy when the respective optical fiber core wires 2 are coated can be increased and the yield can be improved.

Moreover, by winding the processing sheet 4 onto which the respective optical fiber core wires 2 have been fixed in a row onto the sheet receiving apparatus 16 (i.e., the sheet receiving step), the respective optical fiber core wires 2 can be made and then left in their wired state. Namely, because the processing time required by the wiring step to arrange the respective optical fiber core wires 2 in a wire form is normally shorter than the coating step to apply the coating material 7 thereto, by manufacturing and then storing the respective optical fiber core wires 2 with the above-described two steps being performed non-consecutively as separate processes, the respective optical fiber core wires 2 that are in wire form can later be grouped into further combinations. As a result, in cases such as when a large variety of tape core wires are being manufactured in a small quantity, the number of steps required for preparation and adjustments can be decreased and the overall throughput of the apparatus can be improved.

Note that the present invention is not limited to the above-described embodiment and it is also possible, for example, to leave the processing sheet 4 on which the respective optical fiber core wires 2 have been fixed in a row unwound when transporting it to the coating step, and to perform the wiring step and the coating step consecutively. In this case, the structure can be applied not only to the manufacturing of short-length tape core wires and the coating of module components, but also to the manufacturing of extended-length tape core wires.

Moreover, in the above-described wiring apparatus 10, it is also possible for the wiring head 14 to be moved relatively to the respective optical fiber core wires 2, and in the same way, in the coating apparatus 30, it is also possible for the respective optical fiber core wires 2 to be moved relatively to the coating head 32.

Furthermore, in the above-described coating apparatus 30, after forming a wide tape core wire, if this is torn so as to be separated into a desired number of tape core wires, then the throughput can be improved even further. Moreover, the above-described structure makes it possible to apply coatings to the respective optical fiber core wires 2 in two directions by providing coating members 39 on both sides in the direction of relative movement of the coating head 32, however, it is also possible to employ a structure in which, by making it possible to reverse the orientation of the respective optical fiber core wires 2 relative to the coating head 32 by rotating, for example, the coating head 32 or the coating jig 31, it becomes possible to apply a coating in two directions to the respective optical fiber core wires 2.

Here, the respective movable members of the above-described tape core wire manufacturing apparatus 1, namely, the core wire feeding apparatus 11, the sheet feeding apparatus 13, the elevator apparatus 17, the moving apparatus 15, the sheet receiving apparatus 16 or the like that are shown in FIG. 1 can be controlled automatically by a personal computer or the like so as to be in synchronization with each other. This case also falls within the scope of the present invention. In the same way, the sheet feeding apparatus 33, the elevator apparatus 34, the moving apparatus 36, and the dispenser or the dispenser barrels 43 that are shown in FIG. 5 can be controlled automatically by a personal computer or the like so as to be in synchronization with each other. This case also falls within the scope of the present invention.

While preferred embodiments of the invention have been described and illustrated above, it should be understood that these are exemplary of the invention and are not to be considered as limiting. For example, the present invention may also be applied to tape core wires that are formed by arranging in a row conductive wires (i.e., metal wires made of copper or the like) that are used in computers or the like. That is, in the present invention, the single core wires include insulating metal cables and coated optical fibers, and the tape core wires also include insulating metal cables of a tape shape and coated optical fiber ribbons. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A tape core wire manufacturing apparatus that arranges a plurality of single core wires in a row to form a tape shape and that coats these to form a single body, comprising a coating apparatus that applies a coating material to the respective single core wires, wherein the coating apparatus has a coating head that moves in a longitudinal direction relatively to the respective single core wires arranged in a row on a coating jig, and the coating head has a position adjustment surface that is provided at the center of a longitudinal direction of a lower surface of the coating head and that adjusts the position in a thickness direction of the respective single core wires of the tape shape in the vicinity of a coating member of the coating head, and the coating head presses the position adjustment surface against the respective single core wires so that the lower surface of the coating head contacts with the single core wires and is able to be tilted in the longitudinal direction.

2. The tape core wire manufacturing apparatus according to claim 1, wherein the coating member comprises:

a coating layer-forming member;

a discharging member which discharges the coating material; and a coating layer-widening member, wherein the coating layer-forming member forms a gap equal to the thickness to be coated between the coating member and the respective single core wires in a condition in which the position adjustment surface is pressed against the respective single core wires, and the coating layer-forming member spreads the discharged coating material in a transverse direction of the respective single core wires of the tape shape between the discharging member and the gap.

3. The tape core wire manufacturing apparatus according to claim 1, wherein the coating members are provided on both sides of the direction of relative movement of the coating head.

4. The tape core wire manufacturing apparatus according to claim 1, comprising a wiring apparatus which fixes the respective single core wires in a row onto a processing sheet, wherein the wiring apparatus comprises:
 a core wire feeding unit that unwinds the respective single core wires from a plurality of drums;
 a core wire collecting unit that collects the single core wires while applying a predetermined tension to the respective single core wires;
 a sheet feeding unit that feeds the processing sheet used for adhering the respective single core wires thereon; and
 an aligning and fixing unit that arranges the respective single core wires in a row while moving relatively to these respective single core wires, and adheres the respective single core wires onto the processing sheet.

5. The tape core wire wiring apparatus according to claim 4, comprising a sheet receiving unit that collects the processing sheet onto which the respective single core wires are adhered.

6. The tape core wire manufacturing apparatus according to claim 1, wherein both side portions in the longitudinal direction of the head are flange members whose bottom surfaces are displaced to be higher than the position adjustment surface; plate-shaped blades, which are coating layer forming members, are attached to the bottom surface sides of the two flange members; bottom surfaces of the blades are parallel with the position adjustment surface; and gaps that equal the thickness of the coating of the coating material are formed between the bottom surfaces of the blades and the optical fiber core wires, when the position adjustment surface is pressing against the optical fiber core wires.

7. The tape core wire manufacturing apparatus according to claim 1, wherein, when the coating head is moved downwards by an elevator apparatus included in the coating apparatus, the coating head is elastically pressed against the optical fiber core wires and becomes urged downwards.

* * * * *